(12) United States Patent
Salama et al.

(10) Patent No.: US 8,365,776 B2
(45) Date of Patent: Feb. 5, 2013

(54) LIQUEFIED NATURAL GAS PIPELINE WITH NEAR ZERO COEFFICIENT OF THERMAL EXPANSION

(75) Inventors: Mamdouh M. Salama, Richmond, TX (US); Stuart L. Wilson, Pearland, TX (US)

(73) Assignee: ConocoPhillips Company, Houston, TX (US)

( * ) Notice: Subject to any disclaimer, the term of this patent is extended or adjusted under 35 U.S.C. 154(b) by 314 days.

(21) Appl. No.: 12/789,126

(22) Filed: May 27, 2010

(65) Prior Publication Data

US 2010/0313987 A1 Dec. 16, 2010

Related U.S. Application Data

(60) Provisional application No. 61/187,115, filed on Jun. 15, 2009.

(51) Int. Cl.
*F16L 9/14* (2006.01)

(52) U.S. Cl. ......... 138/149; 138/114; 138/137; 138/148

(58) Field of Classification Search .................. 138/149, 138/148, 137, 114
See application file for complete search history.

(56) References Cited

U.S. PATENT DOCUMENTS

| | | | | |
|---|---|---|---|---|
| 3,593,400 | A * | 7/1971 | Geiselman et al. | 29/890.122 |
| 3,830,180 | A | 8/1974 | Bolton | |
| 4,036,617 | A * | 7/1977 | Leonard et al. | 62/50.7 |
| 4,036,618 | A * | 7/1977 | Leonard et al. | 62/50.7 |
| 4,233,816 | A * | 11/1980 | Hensley | 62/50.7 |
| 5,150,812 | A | 9/1992 | Adams | |
| 5,160,769 | A * | 11/1992 | Garrett | 428/36.5 |
| 6,212,891 | B1 | 4/2001 | Minta et al. | |
| 7,147,124 | B2 | 12/2006 | Minta et al. | |
| 7,494,155 | B2 | 2/2009 | Offredi | |
| 2006/0272727 | A1 | 12/2006 | Dinon et al. | |

OTHER PUBLICATIONS

"Technical Challenges of Subsea LNG Pipelines", Colin McKinnon, J P Kenny Ltd., 15 pages.

\* cited by examiner

*Primary Examiner* — Patrick F Brinson
(74) *Attorney, Agent, or Firm* — ConocoPhillips Company

(57) ABSTRACT

The invention provides a pipe assembly for containing and transporting cryogenic temperature fluids.

18 Claims, 1 Drawing Sheet

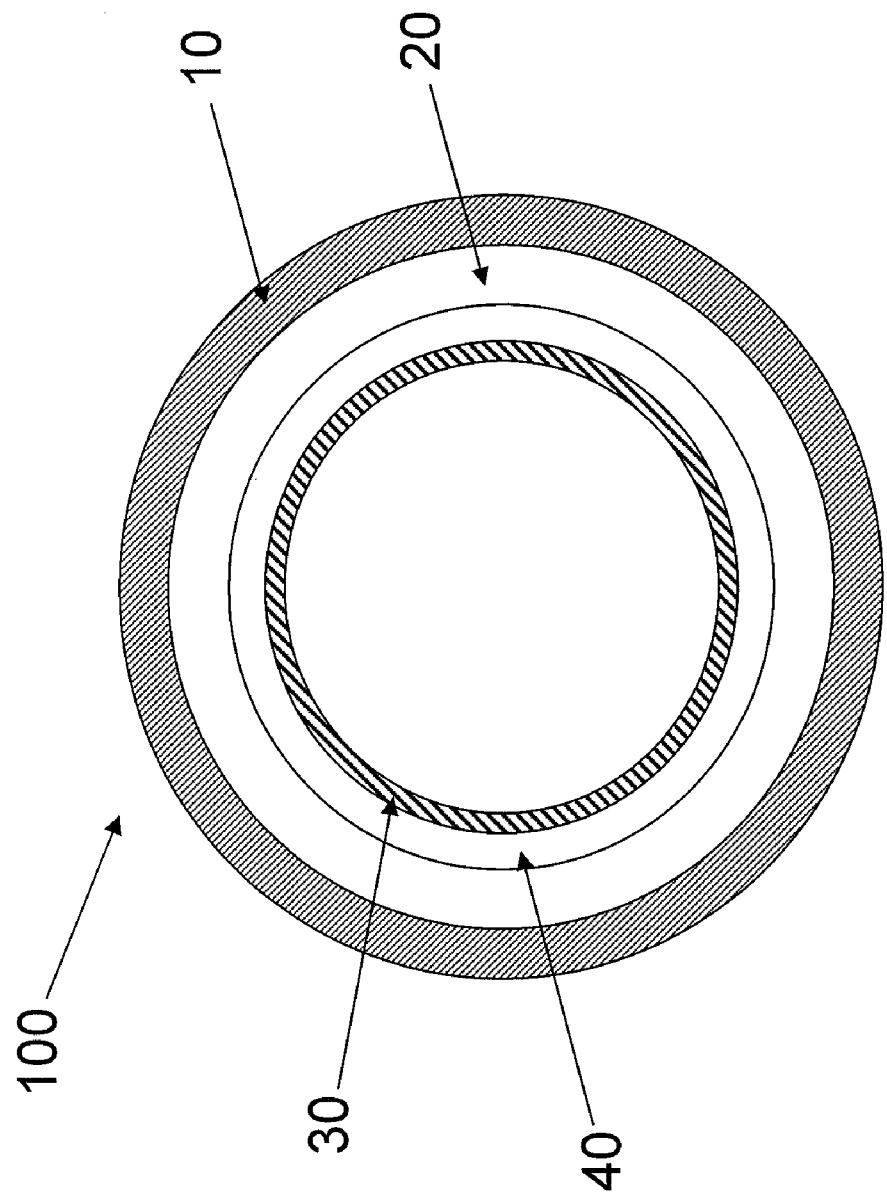

LIQUEFIED NATURAL GAS PIPELINE WITH NEAR ZERO COEFFICIENT OF THERMAL EXPANSION

CROSS-REFERENCE TO RELATED APPLICATIONS

This application claims priority benefit under 35 U.S.C. Section 119(e) to U.S. Provisional Patent Ser. No. 61/187,115 filed on Jun. 15, 2009 the entire disclosure of which is incorporated herein by reference.

FIELD OF THE INVENTION

This invention relates to pipelines suitable for containing and transporting cryogenic temperature fluids. More particularly, the invention relates to pipelines suitable for containing and transporting liquefied natural gas (LNG).

BACKGROUND OF THE INVENTION

Processing, Storage and transportation of Cryogenic fluids such as LNG require the use of materials that have (1) adequate low temperature fracture toughness to ensure against the risk of brittle fracture process, contain, and transport fluids at cryogenic temperatures and (2) adequate strength to hold the fluid pressures without the need for excessive wall thickness. In order to maintain the fluids at the cryogenic temperature during storage and transportation, insulated vessels and pipelines are requires.

Pipe-in-pipe (PIP) assemblies with insulation between the inner and outer pipes are used for the transportation of cryogenic fluids. The inner pipe can be subject to cryogenic temperatures which is −165° C. for LNG while the outer pipe is subject to the atmospheric temperature which can vary between 4° C. to +30° C. depending on whether the PIP is installed underwater or on-land. Because the large temperature differential between the inner and outer pipes of the PIP system the differential thermal contraction between the inner and the outer pipes is considered as critical design factor. The current practice to manage the differential contraction is to install contraction spools or external bellows if the PIP in installed above ground and internal bellows if the PIP is buried. A typical liquefied natural gas (LNG) pipeline utilizes pipe-in-pipe assemblies consisting of 304 stainless steel inner pipe, carbon steel outer pipe and with polyurethane foam insulation. Because the complexity of the contraction spools and bellows, the industry has been considering the use of the specialty 36% nickel alloy, also known with the trade name INVAR, instead of the commonly used 304 SS because the coefficient of thermal expansion of 36% Ni alloy is about one tenth of the 304SS. The use of 36% Ni alloy simplified the PIP design particularly for subsea PIP because it eliminated the need for contraction spools and bellows.

The coefficient of thermal expansion of 304 SS is $17.2 \times 10^{-6}/°$ C. and when a pipe is cooled to the LNG temperature of −165° C. from room temperature of 20° C., it will contract by 2.5 m per km of pipe length. If one is to hold the pipe at its ends to prevent it from contracting, one needs to apply a stress on the pipe in the order 75,000 pounds per square inch of the pipe cross sectional area which, assuming the pipe can be supported to prevent its buckling, is very high. To accommodate this contraction without imposing this high stress or causing buckling, contraction loops or bellows are used. The other option is to use the expensive 36% Ni alloy that has low coefficient of thermal expansion of less than $0.9 \times 10^{-6}/°$ C. and thus controlling its contraction will only require imposing a stress that is less than about 6,000 pounds per square inch of the pipe cross sectional area.

When higher reliability is required, particularly for LNG pipelines that are installed offshore or near residential areas, double barriers are considered by using two inner pipes with insulation between them. This construction is known as a pipe-in-pipe-in-pipe (PIPIP) configuration. The first inner pipe is the primary barrier but in case it leaks the secondary containment is provided by the second inner pipe. Insulation is provided between the second inner pipe and the carbon steel outer pipe. For this construction the use of bellows and contraction spools becomes too complicated. Carbon steel pipe secondary containment is the practice whereby the second pipe is used to provide an additional level of containment should the inner pipe fail or leak. For this to be possible, the second pipe (either intermediate or outer pipe) cannot be carbon steel, as it would fail due to the thermal shock loads. The secondary containing pipe is therefore required to be made of more ductile stainless steel so as to withstand an individual accidental loading down to the minimum LNG operating temperature (−165° C.).

Insulation between the inner cryogenic pipe and the outer steel pipe in case of PIP and between the two inner cryogenic pipes and also between the second cryogenic pipe and the external steel pipe in PIPIP is provided by mechanical insulation such as polyurethane foam or aerogel type materials or by vacuum or by combination of both mechanical insulation and partial vacuum.

A need exists for an alternative to allow the use of low cost cryogenic materials such as 304 SS without the need for the complexity of the contraction loops or the bellows and control the differential contraction of the stainless steel and without the need to resort to the use of the expensive 36% nickel material. The primary object of the present invention is to provide a cryogenic pipeline that is made of low cost materials such as 304 SS but performs as 36% nickel when cooled to the cryogenic temperature.

SUMMARY OF THE INVENTION

In an embodiment of the present invention, a pipe assembly for containing and transporting cryogenic temperature fluids including: (a) at least one inner pipe, wherein the inner pipe is made of stainless steel; (b) a composite overwrap capable of enduring exposure and stress at cryogenic temperatures having a near zero or negative coefficient of thermal expansion, wherein the composite overwrap is bonded to the inner pipe in an axial direction forming a combined composite overwrap and inner pipe, wherein laminate plate theory and optimization software are utilized to reach an overall coefficient of thermal expansion near zero for a combined inner pipe and the composite overwrap; and (c) an outer pipe that is positioned around the combined composite overwrap and inner pipe so as to create an annular space between the exterior surface of the combined composite overwrap and inner pipe and the interior surface of the outer pipe, wherein the annular space between the outer pipe and the combined composite overwrap and the inner pipe is provided with thermal insulation.

In another embodiment of the present invention, a pipe assembly for containing and transporting cryogenic temperature fluids includes: (a) at least one inner pipe wherein the at least one inner pipe is made of material resistant to cryogenic temperatures; (b) a composite overwrap capable of enduring exposure and stress at cryogenic temperatures having a near zero or negative coefficient of thermal expansion, wherein the composite overwrap is bonded to the inner pipe in an axial displacement forming a combined composite overwrap and inner pipe; and (c) an outer pipe that is positioned around the combined composite overwrap and inner pipe so as to create an annular space between the exterior surface of the combined composite overwrap and inner pipe and the interior surface of the outer pipe.

BRIEF DESCRIPTION OF THE DRAWINGS

The invention, together with further advantages thereof, may best be understood by reference to the following description taken in conjunction with the accompanying drawings in which:

FIG. 1 is a schematic diagram of an embodiment of the present invention.

DETAILED DESCRIPTION OF THE INVENTION

Reference will now be made in detail to embodiments of the invention, once or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instances, features illustrated or described as part of one embodiment can be used on another embodiment to yield a still further embodiment. Thus, it is intended that the present invention cover such modifications and variations that come within the scope of the appended claims and their equivalents.

For demonstrative purposes, but not by way of limitation, FIG. 1 illustrates a pipe assembly which is a pipe-in-pipe incorporating features of the present invention. Pipe-in-pipe assemblies are typically insulated to inhibit the transfer of thermal energy between the inner pipe(s) and the surrounding environment (e.g., thermally insulated). As illustrated, pipe-in-pipe assembly 100 comprises an inner pipe 30, an outer pipe 10, and an annular space 20. In an embodiment, the pipe assembly contains multiple external pipes. In an alternate embodiment, pipe-in-pipe-in-pipe (PIPIP) assemblies may be utilized.

Inner pipe 30 serves as the direct path by which cryogenic temperature fluids are contained and transported. Inner pipe 30 is preferably fabricated of a material resistant to liquefied natural gas (LNG) at cryogenic temperatures and capable of achieving a near zero coefficient of thermal expansion. In an embodiment, inner pipe 30 is fabricated of stainless steel. In another embodiment, inner pipe 30 is fabricated of austenitic stainless steel. In another embodiment, inner pipe 30 is fabricated of grade 304 stainless steel. In another embodiment, inner pipe 30 is fabricated of grade 316 stainless steel. In another embodiment, inner pipe 30 is fabricated of any nickel based alloy suitable for cryogenic services.

A composite overwrap 40 surrounds and is bonded to inner pipe 30. The composite wrap includes axial or near axial laminates and hoop laminate. The composite overwrap has a greater thickness than the thickness associated with the inner pipe. In one embodiment, the composite overwrap is thicker than the inner pipe by approximately 10 times. The composite overwrap is fabricated of a material having near zero or negative coefficient of thermal expansion capable of containing and transporting cryogenic temperature fluid, specifically liquefied natural gas. The composite overwrap is preferably a material system comprising high-performance fibers in a resin matrix capable of handling cryogenic temperatures. Composite material is made of structural fibers which are consolidated within a matrix resin. Such structural fibers may be made of graphite, carbon, and aramid (e.g., Kelvar).

Upon reaching cryogenic temperatures, the axial displacement of composite overwrap 40, which is bonded to inner pipe 30 will be close to zero. Composite overwrap 40 inhibits inner pipe 30 from contracting through the bond between inner pipe 30 and composite overwrap 40. To ensure a sufficient bond between the inner pipe and the composite overwrap, several bonding systems will be used. In one embodiment, adhesive bonding is utilized. In another embodiment, mechanical locking via weld beads or local expansions is utilized. In another embodiment, residual stresses (such as accomplished by an autofrettage pressure cycle) is utilized.

The design of the composite pipe that satisfies the desired coefficient of thermal expansion can be achieved by using the laminate plate theory and optimization software. The laminate plate theory is used to calculate the coefficient of thermal expansion of a composite pipe composed of multiple layers of unidirectional composite fibers called laminas. The lamina's unidirectional properties such as modulus, Poisson's ratio, and coefficient of thermal expansion are obtained from the material supplier or by tests. Based on the properties of each individual lamina, design optimization is performed to select the proper orientation of each lamina to achieve the design requirements, i.e., low or negative coefficient of thermal expansion. The optimization process utilizes commercial optimization computer code to systematically vary the number of the laminas and orientation of each lamina to arrive at the solution that falls within the desired bounds of the desired property, i.e., the coefficient of thermal expansion.

The wall thicknesses of the inner pipe(s) and outer pipe can be of any suitable value and typically will be chosen to provide sufficient strength for the pipes when in operation. The inner pipes(s) typically have a wall thickness providing sufficient strength to contain the pressure generated by the flow of fluid, whether liquid or gas, which can be in the order of 3.5 MPa (500 psi). The outer pipe can have any strength, e.g., wall thickness, for the intended application.

The inner pipe(s) and the outer pipe can have any suitable joint length. The choice of the joint length can be dictated, at least in part, by limitations in manufacturing techniques, and by limitations imposed by transportation methods. The outer pipe has an interior surface that is positioned around the inner pipe(s) having an exterior surface(s). Alternatively, the inner pipe has an exterior surface that is positioned within the outer pipe having an interior surface. The placement of the pipes with respect to each other can be performed by any suitable technique. The pipe joints are connected together using welding or mechanical joining to form the desired length of the pipeline.

By way of example, a pipe composed 304 SS wrapped with a carbon fiber composite wrap of the following geometry: thickness of 304 SS of approximately 0.05 inch; thickness of axial carbon fiber composites laminate of approximately 0.45 inch; and thickness of the hoop carbon fiber composite laminate of approximately 0.05 inch. Resulting in a pipe coefficient of thermal expansion (CTE) of $0.85 \times 10^{-6}/°C.$, which is lower than the CTE of Invar and is approximately five percent of the CTE of the 304 SS without the wrap.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described in the present invention. It is the intent of the inventors that variations and equivalents of the invention are within the scope of the claims below and the description, abstract and drawings not to be used to limit the scope of the invention.

The invention claimed is:

1. A pipe assembly for containing and transporting cryogenic temperature fluids comprising:
   a) at least one inner pipe;
   b) a composite overwrap that at least partially surrounds the at least one inner pipe, wherein the composite overwrap is capable of enduring exposure and stress at cryogenic temperatures and has a near zero or negative coefficient of thermal expansion, wherein the composite overwrap is bonded to the inner pipe along an axial direction defined by the inner pipe to form a combined composite overwrap and inner pipe, wherein the combined composite overwrap and inner pipe is characterized by an overall coefficient of thermal expansion near zero; and
   c) an outer pipe that at least partially surrounds the combined composite overwrap and inner pipe so as to define an annular space between the exterior surface of the combined composite overwrap and inner pipe and the interior surface of the outer pipe, wherein the annular space between the outer pipe and the combined composite overwrap and the inner pipe is provided with thermal insulation.

2. The pipe assembly according to claim 1, wherein the assembly is selected from the group consisting of: multiple external pipes, pipe-in-pipe assembly, and pipe-in-pipe-in pipe assembly.

3. The pipe assembly according to claim 1, wherein the inner pipe is made of a material selected from the group consisting of: austenitic stainless steel, grade 304 stainless steel, and grade 316 stainless steel.

4. The pipe assembly according to claim 1, wherein the inner pipe is made of a material selected from the group consisting of: grade 304 stainless steel, grade 316 stainless, and grade 9 percent nickel alloy.

5. The pipe assembly according to claim 1, wherein the composite overwrap is bonded to the inner pipe utilizing mechanical locking via weld beads.

6. The pipe assembly according to claim 1, wherein the composite overwrap is bonded to the inner pipe utilizing residual stresses is accomplished by an autofrettage pressure cycle.

7. A pipe assembly for containing and transporting cryogenic temperature fluids comprising:
   a) at least one inner pipe wherein the at least one inner pipe is made of material resistant to cryogenic temperatures;
   b) a composite overwrap capable of enduring exposure and stress at cryogenic temperatures having a near zero or negative coefficient of thermal expansion, wherein the composite overwrap is bonded to the inner pipe in an axial displacement forming a combined composite overwrap and inner pipe; and
   c) an outer pipe that at least partially surrounds the combined composite overwrap and inner pipe so as to define an annular space between the exterior surface of the combined composite overwrap and inner pipe and the interior surface of the outer pipe.

8. The pipe assembly according to claim 7, wherein the assembly is selected from the group consisting of: multiple external pipes, pipe-in-pipe assembly, and pipe-in-pipe-in-pipe assembly.

9. The pipe assembly according to claim 7, wherein the inner pipe is made of material capable of assisting in achieving near zero or negative coefficient of thermal expansion.

10. The pipe assembly according to claim 7, wherein the inner pipe is made of a material selected from the group consisting of: austenitic stainless steel, grade 304 stainless steel, and grade 316 stainless steel.

11. The pipe assembly according to claim 7, wherein the composite overwrap is bonded to the inner pipe utilizing mechanical locking via weld beads.

12. The pipe assembly according to claim 7, wherein the composite overwrap is bonded to the inner pipe utilizing residual stresses is accomplished by an autofrettage pressure cycle.

13. A pipe assembly for containing and transporting cryogenic temperature fluids comprising:
   a) at least one inner pipe wherein the at least one inner pipe is made of material resistant to cryogenic temperatures;
   b) a composite overwrap capable of enduring exposure and stress at cryogenic temperatures having a near zero or negative coefficient of thermal expansion, wherein the composite overwrap is bonded to the inner pipe in an axial displacement forming a combined composite overwrap and inner pipe by utilizing at least one of: laminate plate theory and optimization software to satisfy the near zero or negative coefficient of thermal expansion, adhesive bonding, and residual stresses; and
   c) an outer pipe that at least partially surrounds the combined composite overwrap and inner pipe to define an annular space between the exterior surface of the combined composite overwrap and inner pipe and the interior surface of the outer pipe.

14. The pipe assembly according to claim 13, wherein the assembly is selected from the group consisting of: multiple external pipes, pipe-in-pipe assembly, and pipe-in-pipe-in-pipe assembly.

15. The pipe assembly according to claim 13, wherein the inner pipe is made of material capable of assisting in achieving near zero or negative coefficient of thermal expansion.

16. The pipe assembly according to claim 13, wherein the inner pipe is made of a material selected from the group consisting of: austenitic stainless steel, grade 304 stainless steel, and grade 316 stainless steel.

17. The pipe assembly according to claim 13, wherein the composite overwrap is bonded to the inner pipe utilizing residual stresses is accomplished by an autofrettage pressure cycle.

18. The pipe assembly according to claim 13, wherein the composite overwrap is made of a material selected from the group consisting of: graphite, carbon, and aramid.

* * * * *